(12) United States Patent
Fujisawa (10) Patent No.: US 8,276,172 B2
(45) Date of Patent: Sep. 25, 2012

(54) SLOT-LOADING TYPE DISK DEVICE HAVING A THIN PROFILE

(75) Inventor: Shinichi Fujisawa, Akiruno (JP)

(73) Assignee: TEAC Corporation, Tama-shi, Tokyo (JP)

( * ) Notice: Subject to any disclaimer, the term of this patent is extended or adjusted under 35 U.S.C. 154(b) by 410 days.

(21) Appl. No.: 12/626,552

(22) Filed: Nov. 25, 2009

(65) Prior Publication Data

US 2010/0138846 A1    Jun. 3, 2010

(30) Foreign Application Priority Data

Nov. 28, 2008   (JP) ................................. 2008-303925

(51) Int. Cl.
*G11B 17/04* (2006.01)
(52) U.S. Cl. .................... 720/690; 720/622; 720/697
(58) Field of Classification Search .......... 720/617–626, 720/695–698
See application file for complete search history.

(56) References Cited

U.S. PATENT DOCUMENTS

| 2008/0163275 A1* | 7/2008 | Eguchi | 720/623 |
| 2008/0301722 A1 | 12/2008 | Wada | |
| 2009/0125925 A1* | 5/2009 | Izumiya | 720/620 |

FOREIGN PATENT DOCUMENTS

| JP | 3822621 B2 | 3/2006 |
| JP | 2008226359 A | 9/2008 |

OTHER PUBLICATIONS

Japanese Office Action dated Jun. 21, 2012, issued in corresponding JP Application No. 2008-303925, 5 pages.

* cited by examiner

*Primary Examiner* — Nathan Danielsen
(74) *Attorney, Agent, or Firm* — Seed IP Law Group PLLC (57) ABSTRACT

A lifting frame has a lifting pin that fits into a lifting cam groove of a follower slider, and swings up and down about a rod near a disk slot. A holding member is swingably attached to front end of the lifting frame. This holding member supports a turntable unit for holding a disk. The holding member has a cam follower pin that fits into a swinging cam groove of a loading slider to raise and lower the holding member. When the lifting frame swings down from a read/write position to a lowered position, the holding member inclines from the lifting frame so as to place the turntable unit substantially parallel to a disk carrying direction.

6 Claims, 8 Drawing Sheets

SLOT-LOADING TYPE DISK DEVICE HAVING A THIN PROFILE

FIELD OF THE INVENTION

The present invention relates to a disk device of slot-loading type.

BACKGROUND OF THE INVENTION

A disk device, or disk drive, is a device that writes data to a magnetic or optical disk and reads data stored on the disk. There is a type of disk drive called a slot-loading type disk drive that carries in and out, or loads and ejects, a disk through a slot. Because of its thin profile, the slot-loading type is widely used in notebook computers.

A typical slot-loading disk drive has a bezel on a front face of its case, and a slot formed in the bezel. The disk to be loaded is inserted halfway to the slot. When the disk pushes a disk carrying mechanism slightly, a loading motor starts rotating. The rotation of the loading motor actuates the disk carrying mechanism, which carries the disk into the case. Then, a loading slider slides to raise a lifting frame. The lifting frame is raised from a lowered position to a chuck position where the disk is held by a chucking head of a turntable unit. Subsequently, the lifting frame is slightly lowered to rest in a read/write position, and the turntable unit starts rotating the disk to read data from or write data to the rotating disk by means of a pickup head. Upon a press of an eject button, the disk carrying mechanism works to carry out, or eject, the disk through the slot.

The lifting frame is arranged to place its front end mounting the turntable unit in the center of the case, and configured to swing vertically about a shaft on its rear end so as to bring the front end up and down. With no disk loaded, the lifting frame stays in the lowered position. The pickup head is held between two guide shafts attached to the lifting frame, and moves in a disk-radial direction along these guide shafts.

A current trend requires the slot-loading disk drive to have an even-thinner profile. In view of this, U.S. Patent Application Publication No. 2008/0301722 A1 (corresponding to Japanese Patent No. 3822621) discloses a disk device that lowers only the turntable unit and keeps the lifting frame up and flat in the disk ejecting operation. This serves to eliminate the space for moving the lifting frame from the flat (horizontal) position to the lowered position. To lower the turntable unit, the instant disk device has two sliders that slide crosswise in accordance with the movements of the disk carrying mechanism. Each of the sliders has several cam grooves for receiving cam pins of the turntable unit so as to raise and lower the turntable unit in a horizontal posture.

However, configured to keep the lifting frame flat in the read/write position as the disk is carried, the instant disk device cannot provide an enough space for inserting the disk, making it difficult to insert the disk. Additionally, since the instant disk device uses many cam grooves and cam pins to move the turntable unit in a horizontal posture, the increased number of components raises the manufacturing cost.

SUMMARY OF THE INVENTION

In view of the foregoing, it is a main object of the present invention to provide a disk device having a thin-profile while providing an enough space for inserting a disk.

Another object of the present invention is to provide a disk device having a simplified structure for moving a turntable unit.

In order to achieve the above and other objects, the disk device according to the present invention includes a disk carrying mechanism, a lifting frame, a turntable unit holding member, a lifting frame shift mechanism and a turntable unit shift mechanism. The disk carrying mechanism, in a disk loading operation, holds a disk inserted through a slot on a case of the disk device, and carries the disk to above the turntable unit. In a disk ejecting operation, the disk carrying mechanism holds the disk on the turntable unit, and carries the disk out of the slot. The lifting frame movably supports a pickup head, and swings up and down about its rear end disposed near the slot, so as to raise and lower its front end. The turntable unit holding member holds the turntable unit, and is swingably attached to the front end of the lifting frame. The lifting frame shift mechanism moves, or shifts, the lifting frame between a chuck position and a lowered position. The chuck position, which is a position to attach the disk to the turntable unit, is located above a read/write position where data is read from or written to the disk. The lowered position is located below the read/write position, and is a position to allow the disk to be carried in and out. The turntable unit shift mechanism swings the turntable unit from a parallel position to a retracted position as the lifting frame is shifted down from the read/write position to the lowered position. In the parallel position, the turntable unit is substantially parallel to the lifting frame. In the retracted position, the turntable unit is inclined from the lifting frame to lower its one end near the slot relative to the other end.

In a preferred embodiment of the present invention, the disk carrying mechanism includes a loading slider to slide when the disk is carried, a follower slider to slide with the loading slider, and a plurality of arms that work with the loading slider or the follower slider, and swing the disk up and down while holding the disk from both sides.

The loading slider slides in a carrying direction of the disk, and the follower slider slides in a crosswise direction to the loading slider.

The lifting frame shift mechanism, in the preferred embodiment, includes a lifting pin attached to the lifting frame, and a cam groove that is formed in the loading slider or the follower slider and receives the lifting pin.

The turntable unit shift mechanism, in the preferred embodiment, includes a cam follower pin attached to the turntable unit holding member, and a cam groove that is formed in the loading slider and receives the cam follower pin.

The disk device, in the preferred embodiment, further includes a plurality of support rods and coil springs. The support rods are attached to the lifting frame to movably support the turntable unit holding member. The coil springs are put onto the support rods, and push the turntable unit to the lifting frame.

According to the present invention, the turntable unit holding member inclines from the lifting frame as the lifting frame is lowered from the read/write position to the lowered position. Compared to the conventional lifting frame that directly supports the turntable unit, the distance from the read/write position to the lowered position can be reduced. Accordingly, the disk device has an ever-thinner profile. Additionally, in the disk loading operation, the lifting frame rests in the lowered position below the read/write position, and facilitates insertion of the disk into the case.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
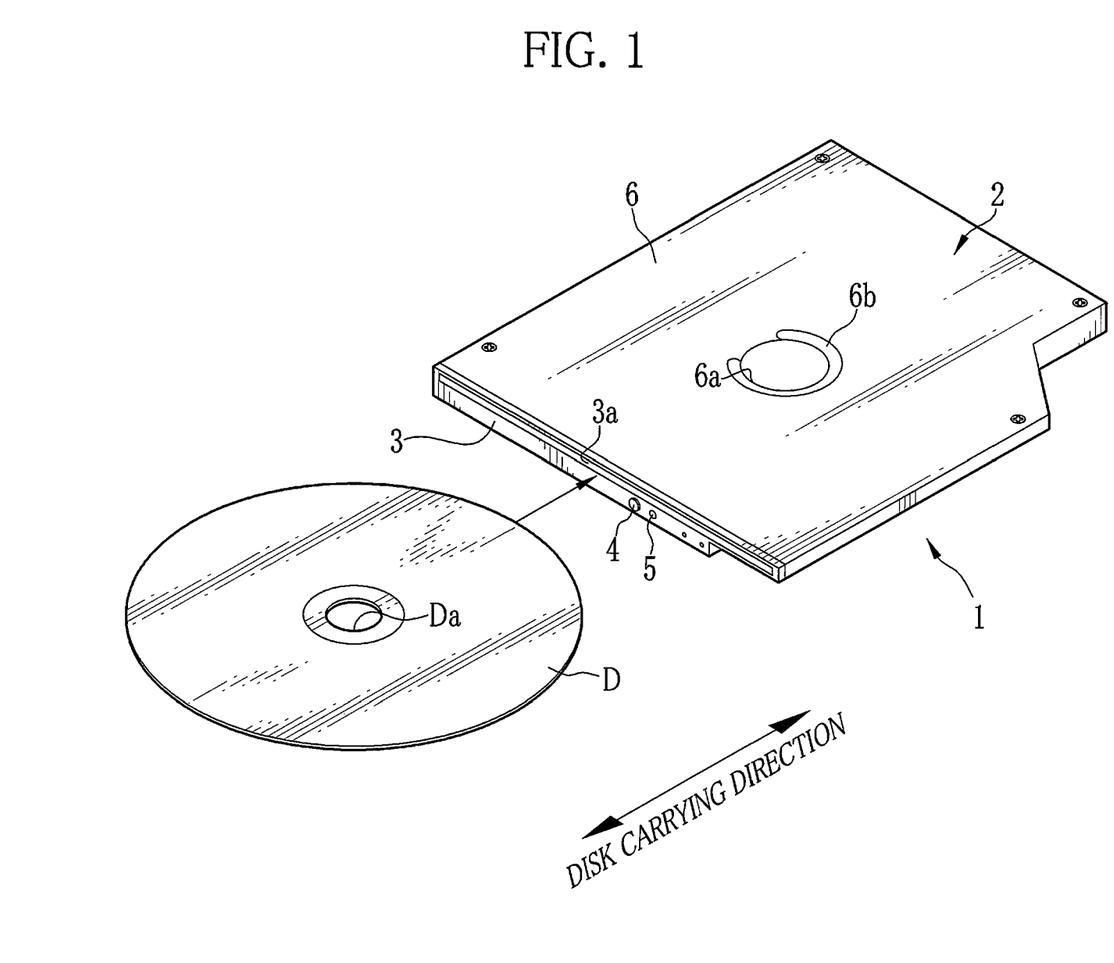
FIG. 1 is a perspective view of a disk device according to the present invention.

Referring to FIG. 1, a disk device 1 has a sealed case 2. A bezel 3 is attached to a front face of the case 2. The bezel 3 includes a slot 3a for inserting a disk D, a push button 4 to be pressed for ejecting the disk D, and an indicator 5 for showing a current operating condition of the disk device 1.

The case 2 is closed by a top plate 6. This top plate 6 has an opening 6a in the middle for receiving a chucking head 16 (see, FIG. 2) in a disk-chucking operation. The opening 6a is surrounded by an arcuate groove 6b that forms an arcuate projection on an inner wall of the case 2. This arcuate projection supports the disk D when the chucking head 16 penetrates into a center hole Da of the disk D.

Figure 2:
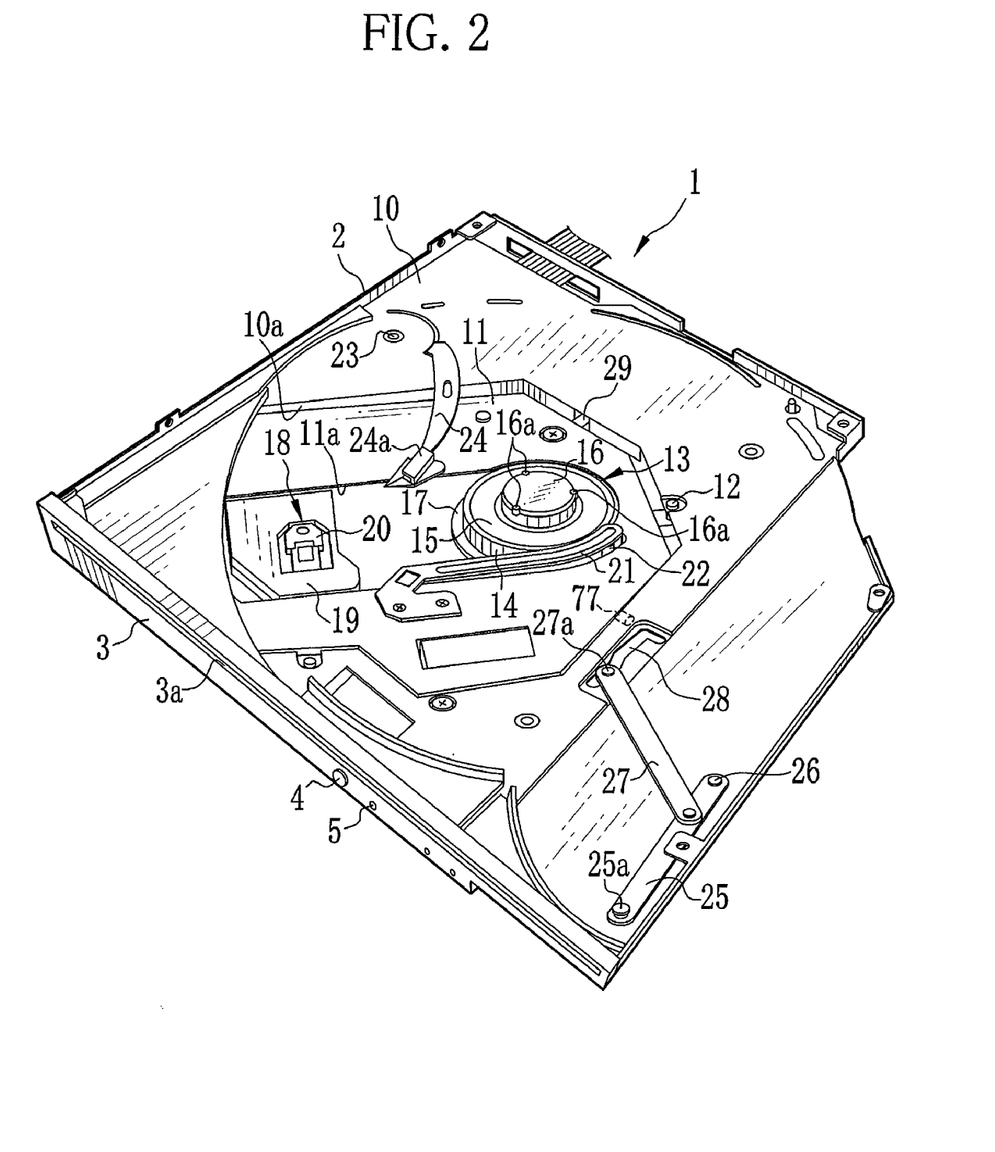
FIG. 2 is a perspective view of the disk device without a top plate.
Figure 3:
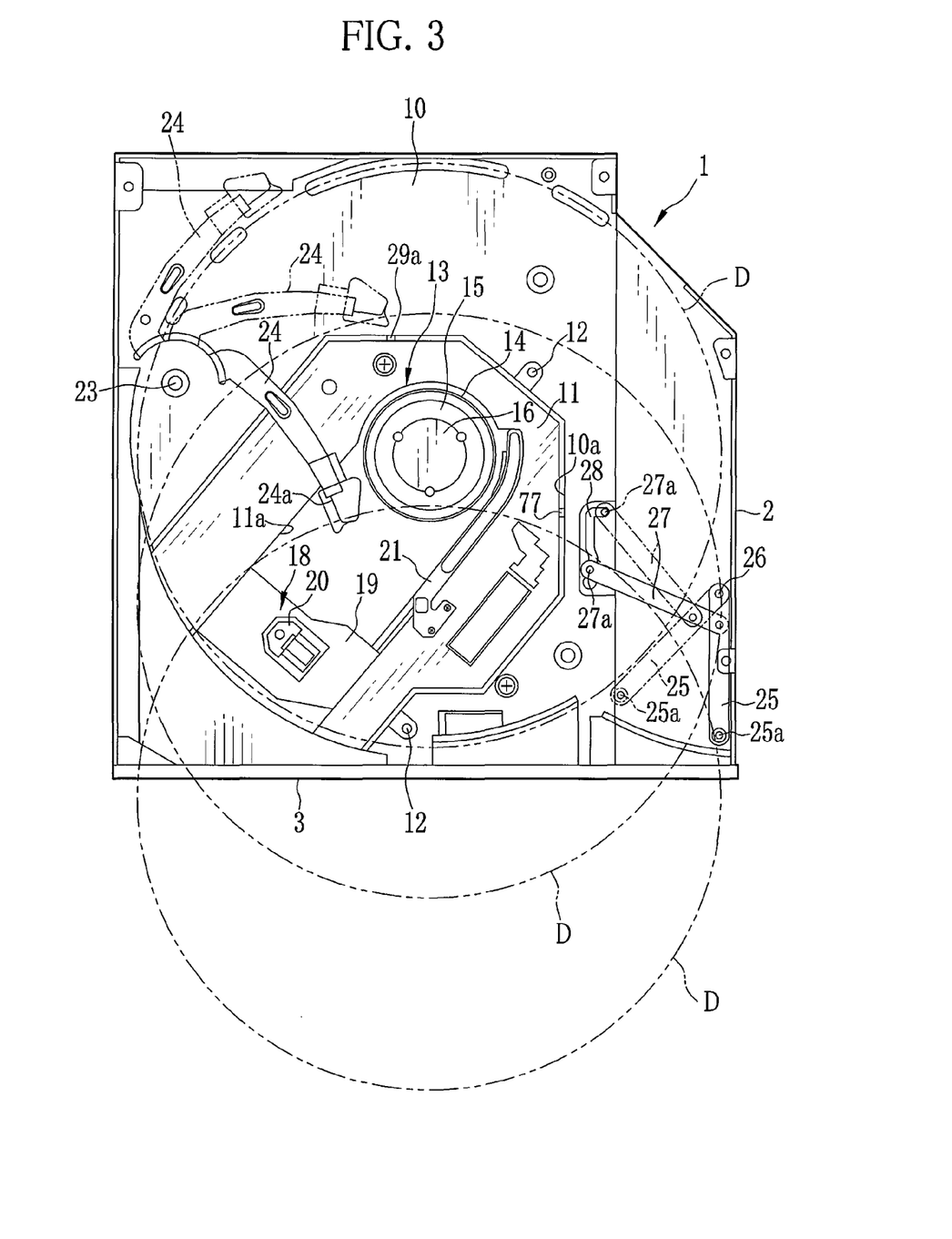
FIG. 3 is a plan view of the disk device without a top plate.

As shown in FIG. 2 and FIG. 3, an interior of the case 2 is separated into upper and lower portions by a base panel 10. The base panel 10 has a panel opening 10a extending obliquely downward from its center. In the panel opening 10a, a lifting frame 11 is placed. The lifting frame 11 has a frame opening 11a extending obliquely downward from its center.

In loading and ejecting the disk D, the lifting frame 11 swings up and down about a shaft 9 (see, FIG. 4) to raise and lower its front end in the center of the case 2. To diminish vibrations of this lifting action, the lifting frame 11 is attached at several points to the base panel 10 through a conventional cushion support assembly 12.

A turntable unit 13 is mounted to the front end of the lifting frame 11 by means of a holding member 17. The turntable unit 13 is suspended to swing up and down on the lifting frame 11. The turntable unit 13 includes a spindle motor 14, a turntable 15 and the chucking head 16. The spindle motor 14 is attached to the holding member 17. The turntable 15 is attached to a drive shaft of the spindle motor 14. The chucking head 16 is integrated with the turntable 15 and, as the lifting frame 11 is raised, holds the disk D in a chuck position. This chucking head 16 has a plurality of spring-biased chucking claws 16a, which catch the disk D in a removable manner.

A pickup head 18 is movably attached to the lifting frame 11. The pickup head 18 is composed of a carriage 19 placed downstream of the opening 11a, and a pickup element 20 mounted on the carriage 19. In reading or writing data, the carriage 19 moves along the frame opening 11a, or namely, in a radial direction of the disk D. The lifting frame 11 has a lifting pin 29 projecting horizontally on the tip to bring the lifting frame 11 up and down.

The lifting frame 11 has a disk guide piece 21 for guiding the bottom of the disk D. The disk guide piece 21 extends in a carrying direction of the disk D, and reaches the side of the turntable 15. Forming an upward slope toward its tip, the disk guide piece 21 lifts the disk D in loading to prevent it from contacting the chucking head 16.

A chuck-release pin 22 is provided below the tip of the disk guide piece 21. When the lifting frame 11 goes down for ejecting the disk D, the disk guide piece 21 comes into contact with the chuck-release pin 22 and stops descending. The disk D is then received by the disk guide piece 21 that has stopped descending, and released from the chucking head 16 that keeps going down.

The base panel 10 swingably holds a disk support arm 24 for carrying the disk D, and a disk loading arm 25 for carrying the disk D on the slot 3a into the case 2. The disk support arm 24 supports a front edge of the disk D with a holder 24a, and rotates about a pivot 23. The disk loading arm 25 supports a rear edge of the disk D with a flanged roller 25a, and rotates about a pivot 26. For this rotating action, the disk loading arm 25 is coupled to a link lever 27. The link lever 27 has a cam pin 27a that slides in a guide slit 28.

In FIG. 3, the chain double-dashed lines show the disks D in an ejected position, an auto-loading start position and the chuck position.

Figure 4:
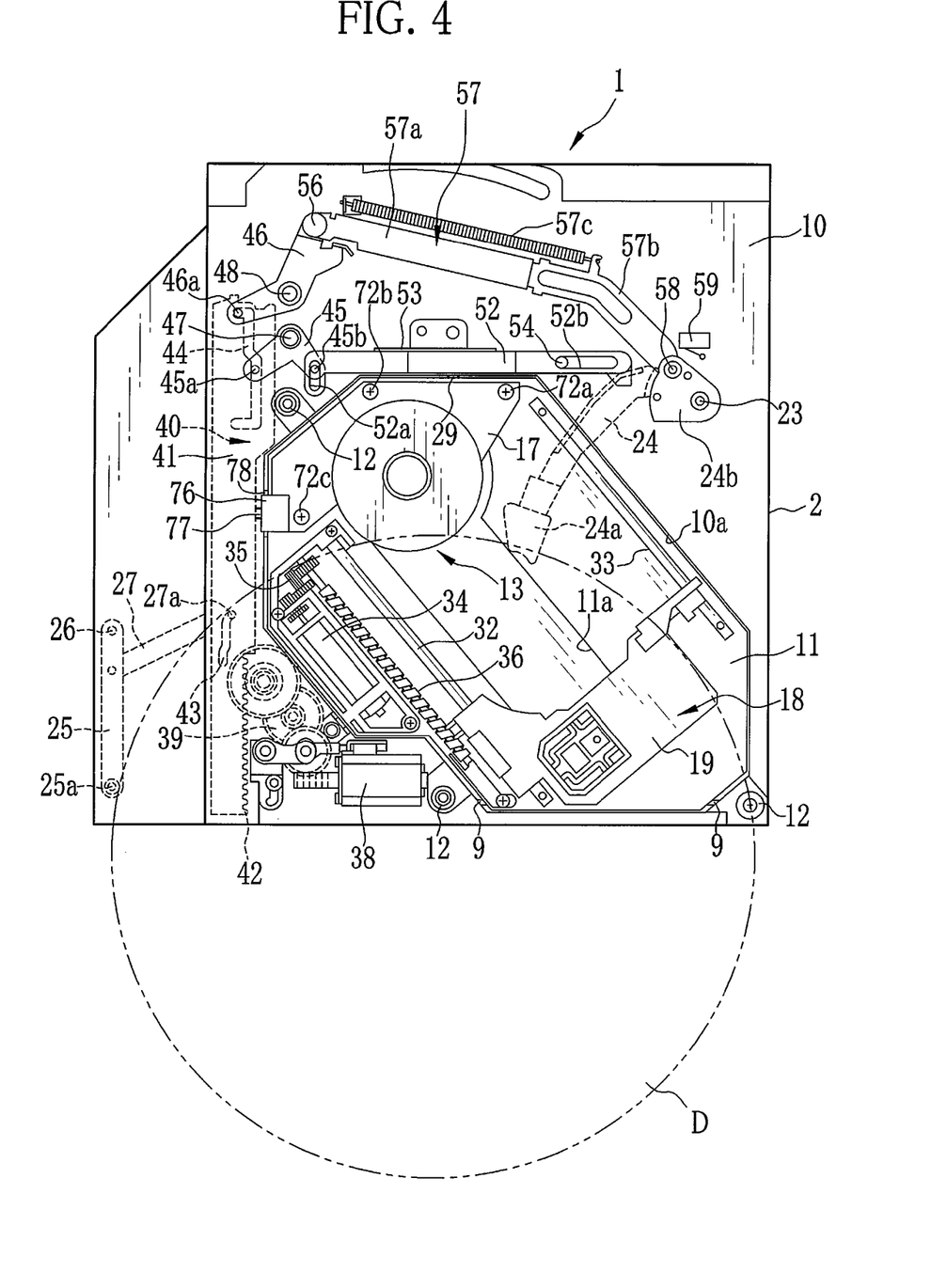
FIG. 4 is a bottom plan view of the disk device without a bottom plate.

As shown in FIG. 4, the carriage 19 sits on two guide shafts 32, 33. These guide shafts 32, 33 are secured at both ends to an undersurface of the lifting frame 11. Rotation of a thread motor 34 is transmitted by a gear train 35 to a screw shaft 36. The screw shaft 36 is thus rotated to move the carriage 19 forward or backward.

A loading motor 38 is mounted on an undersurface of the base panel 10. Rotation of this loading motor 38 is transmitted by a gear train 39 to a disk carrying mechanism 40, and the disk D is loaded into or ejected from the case 2. The disk carrying mechanism 40 includes a loading slider 41, the disk support arm 24 and the disk loading arm 25.

The loading slider 41 has a rack gear 42 that meshes with the last gear in the gear train 39, and slides back and forth along a side wall of the case 2 in accordance with the rotation of the loading motor 38. The disk D is loaded into the case 2 as the loading slider 41 moves in a direction away from the bezel 3 (i.e., moves forward), and is ejected from the case 2 as the loading slider 41 moves in the opposite direction (i.e., moves backward).

The loading slider 41 has cam grooves 43, 44. The cam groove 43 overlaps with the guide slit 28, and receives the cam pin 27a of the link lever 27 that passes through the guide slit 28 (see, FIG. 5). When the loading slider 41 slides forward or backward, the cam groove 43 together with the guide slit 28 drags the link lever 27. The cam groove 44 receives two cam pins: a cam pin 45a of a link lever 45 and a cam pin 46a of a link lever 46. Upon the forward or backward slide of the loading slider 41, the link levers 45, 46 rotate about their pivots 47, 48.

The link lever 45 has a cam pin 45b that fits into a slit 52a of a follower slider 52. The follower slider 52 has a guide slot 52b that receives a pin 54, and its back wall comes into contact with a guide plate 53 secured to the base panel 10.

The link lever 46 is coupled to a link arm 57 by a pin 56. The link arm 57 is connected to a base 24b by a pin 58. The base 24b is integrally connected by the pivot 23 to the disk support arm 24 projecting from the foreside of the base panel 10. A switch 59 is disposed near the base 24b. This switch 59 turns on when the disk D being inserted rotates the disk support arm 24 by a certain angle. Receiving a signal of the switch 59, a control circuit (not shown) actuates the loading motor 38 to start an auto-disk loading operation of the disk carrying mechanism 40.

The link arm 57 includes a first arm 57a, a second arm 57b slidably connected to the first arm 57a, and a spring 57c for keeping the link arm 57 in the shortest length. This expandable link arm 57 allows the disk support arm 24 to rotate without moving the link lever 46 during the time between the insertion of the disk D to the slot 3a and the onset of the auto-disk loading operation of the disk carrying mechanism 40.

Figure 5:
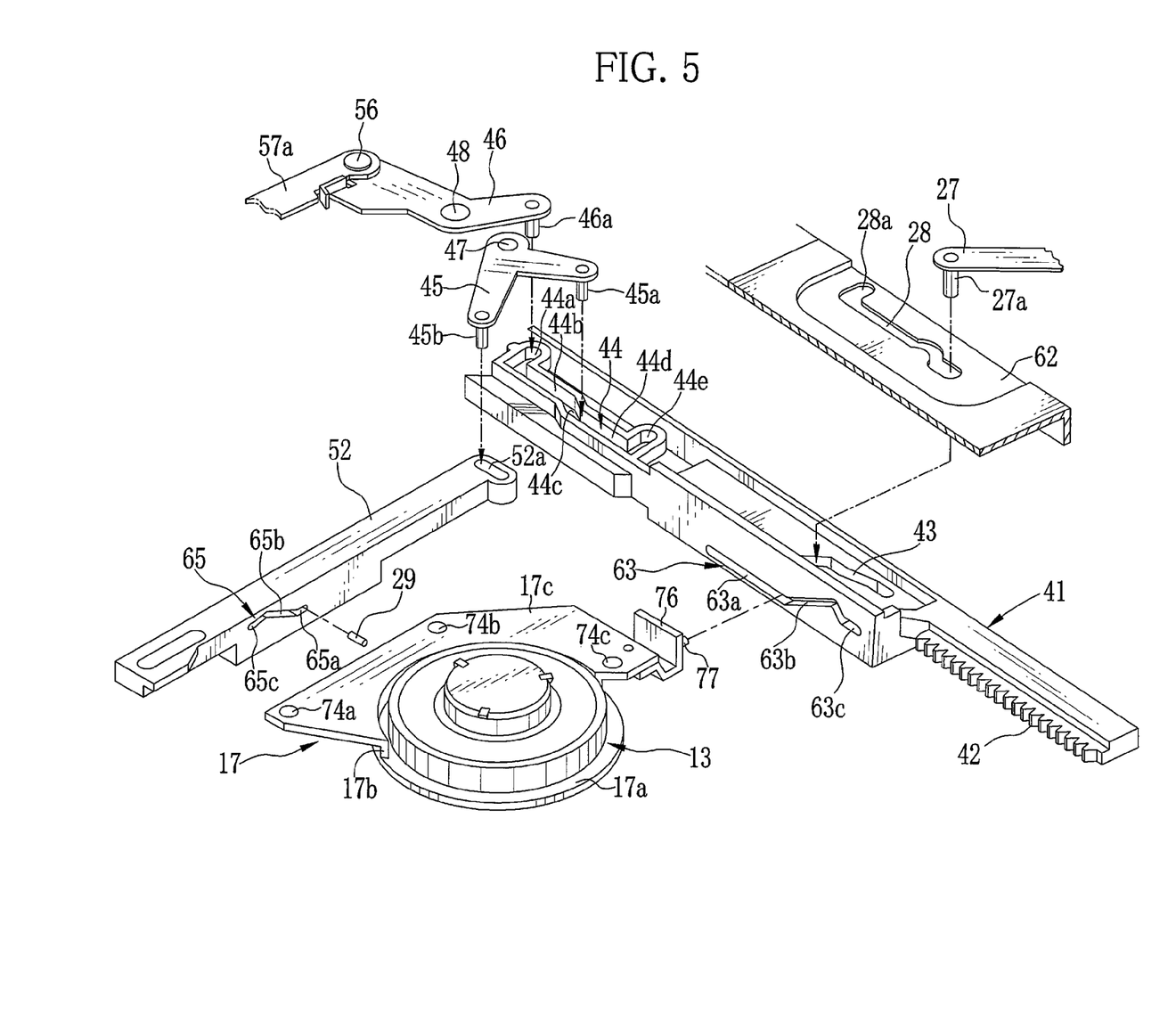
FIG. 5 is a perspective view showing a loading slider and a follower slider.
Figure 6:
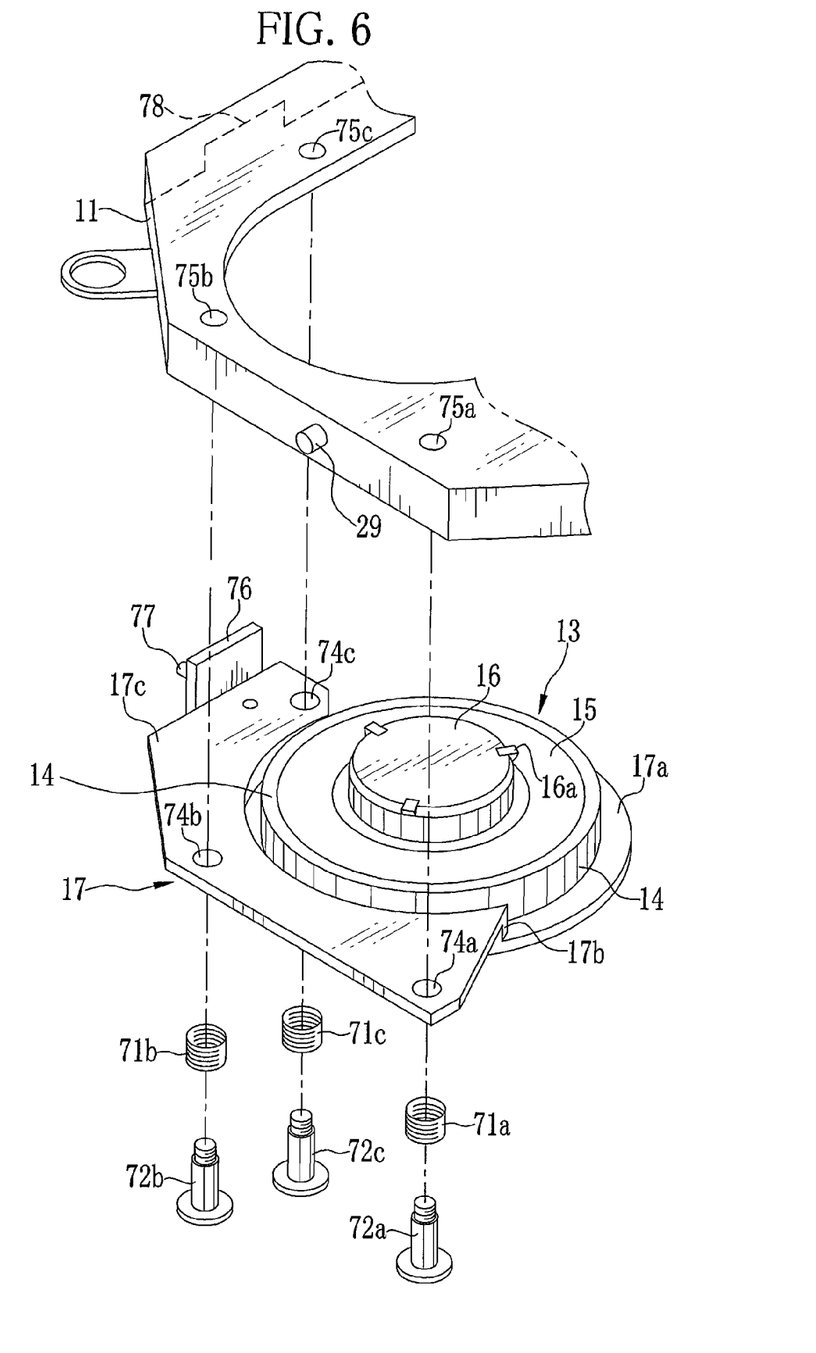
FIG. 6 is an exploded perspective view showing a lifting frame and a turntable unit holding member.

As better shown in FIG. 5, the loading slider 41 is a rectangular rod that slides between a guide plate 62 and a bottom plate 2a of the case 2. The guide plate 62 has the guide slit 28, and is secured to the base panel 10. As above described, the loading slider 41 has the rack gear 42 and the cam grooves 43, 44.

The cam groove 44 has a horizontal groove portion 44a, a first vertical groove portion 44b, a sloping groove portion 44c and a second vertical groove portion 44d which are joined together. Before the loading of the disk D, the cam pin 46a of the link lever 46 rests in the horizontal groove portion 44a, and the cam pin 45a of the link lever 45 rests in the second vertical groove portion 44d.

The follower slider 52 has a cam groove 65 for raising and lowering the lifting frame 11 (hereinafter, lifting cam groove). This lifting cam groove 65 receives the lifting pin 29 of the lifting frame 11. The lifting cam groove 65 has a lower groove portion 65a for placing the lifting frame 11 in the lowered position, a sloping groove portion 65b for raising and lowering the lifting frame 11, and a higher groove portion 65c for placing the lifting frame 11 in the read/write position. The follower slider 52 makes contact with a bent portion 10b of the base panel 10 on the front face and with the guide plate 53 on the rear face (see, FIG. 7A).

As shown in FIG. 6 and FIG. 7A to FIG. 7C, the holding member 17 is swingably attached, or suspended, to the leading end of the lifting frame 11 by means of coil springs 71a to 71c and support rods 72a to 72c. The holding member 17 includes a circular base portion 17a for mounting the spindle motor 14, a semi-circular bent portion 17b formed by bending a part of the base portion 17a upwards, and an attachment portion 17c extending laterally from the bent portion 17b. The attachment portion 17c has through holes 74a to 74c for receiving the screw-head support rods 72a to 72c. These support rods 72a to 72c penetrate the coil springs 71a to 71c and the through holes 74a to 74c, and thread into screw holes 75a to 75c of the lifting frame 11. In the read/write position (or flat horizontal position) shown in FIG. 7C, the holding member 17 is pushed by the coil springs 71a to 71c to come into close contact with the lifting frame 11. In the lowered position (or retracted position) shown in FIG. 7A, by contrast, the holding member 17 inclines from the lifting frame 11 against the force of the coil springs 71a to 71c. These coil springs may be replaced with leaf springs or the like.

Figure 7A:
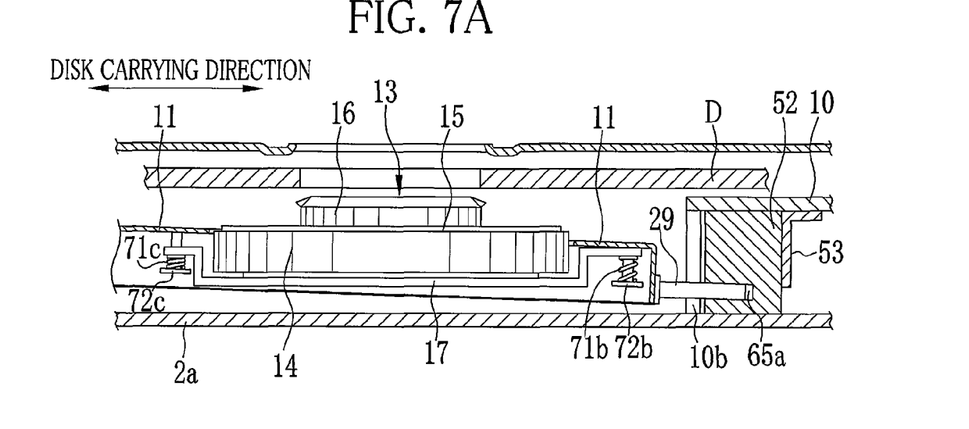
FIG. 7A to FIG. 7C are cross-sectional views showing a disk chucking operation.

On a lateral end of the attachment portion 17c, there is provided an upwardly projecting member 76. This projecting member 76 has a cam follower pin 77 that extends laterally to swing the holding member 17 up and down. The projecting member 76 projects to the loading slider 41 through a cut-out 78 on a side face of the lifting frame 11. The cam follower pin 77 is disposed closer to the slot 3a than a line connecting the support rods 72a, 72b. Accordingly, when the cam follower pin 77 slides in a cam groove 63 (see, FIG. 5) provided in the loading slider 41 (hereinafter, swinging cam groove), one end of the holding member 17 goes down along the support rod 72c. At this point, as shown in FIG. 7A, the holding member 17 swings about a line connecting the through holes 74a, 74b, and inclines from the lifting frame 11.

As shown in FIG. 5, the swinging cam groove 63 of the loading slider 41 receives the cam follower pin 77 of the holding member 17. The swinging cam groove 63 leads to raise the holding member 17 when the lifting frame 11 goes up. Additionally, after the lifting frame 11 reaches the read/write or lowered position, the swinging cam groove 63 leads to move the holding member 17 so as to place the turntable unit 13 parallel to the disk carrying direction. The swinging cam groove 63 has a lower groove portion 63a for placing the holding member 17 in the lowered position, a sloping groove portion 63b for raising and lowering the holding member 17, and a higher groove portion 63c for placing the holding member 17 in the read/write position.

Next, with reference to FIG. 7A to FIG. 7C and FIG. 8, the operation of the disk device 1 is described. Until the disk D is inserted to the slot 3a, the lifting frame 11 stays in the lowered position as in FIG. 7A. At this point, the lifting pin 29 of the lifting frame 11 rests in the lower groove portion 65a of the lifting cam groove 65 in the follower slider 52, and the cam follower pin 77 of the holding member 17 rests in the lower groove portion 63a of the swinging cam groove 63 in the loading slider 41. As better shown in FIG. 8, when the cam follower pin 77 stays in the lower groove portion 63a, the holding member 17 rotates about the horizontal line connecting the through holes 74a, 74b against the force of the coil springs 71a to 71c, and swings its one end near the slot 3a down from the lifting frame 11. This rotation places the turntable unit 13 parallel to the disk carrying direction. Accordingly, the disk D can avoid contacting the chucking head 16 in the disk loading operation even in the thinner-profile disk device 1 where the distance between the lowered position and the read/write position of the lifting frame 11 is decreased.

As shown in FIG. 3 and FIG. 4, when the disk D is inserted into the case 2 through the slot 3a, the leading edge of the disk D is supported by the holder 24a of the disk support arm 24. Additional push of the disk D causes the link arm 57 to expand, and causes the disk support arm 24 and the base 24b to rotate in the counterclockwise direction of FIG. 3 about the pivot 23. During this, the front end of the disk D is kept supported by the disk guide piece 21 so as not to sink.

When the holder 24a of the disk support arm 24 passes over the lifting frame 11, the base 24b turns on the switch 59. In response to the signal of the switch 59, the loading motor 38 starts rotating, and the disk carrying mechanism 40 starts the auto-disk loading operation.

The rotation of the loading motor 38 is transmitted by the gear train 39 to the loading slider 41. The loading slider 41 moves away from the bezel 3. During this movement, the cam groove 43 drags the cam pin 27a of the link lever 27 along the guide slit 28. This slide of the cam pin 27a moves the link lever 27, and causes the disk loading arm 25 to rotate in the clockwise direction of FIG. 3 about the pivot 26. The disk loading arm 25 in rotation pushes the rear edge of the disk D by means of the flanged roller 25a.

Also, the loading slider 41 uses the horizontal groove portion 44a of the cam groove 44 to rotate the link lever 46 in the clockwise direction of FIG. 4. This rotation of the link lever 46 is transmitted by the link arm 57 to the base 24b, and rotates the disk support arm 24 in the counterclockwise direction of FIG. 3. As a result, the disk D is held by the disk support arm 24 and the disk loading arm 25, and brought into the case 2.

As shown in FIG. 3, when the disk D reaches the chuck position, the center hole Da of the disk D overlaps the chucking head 16. In this chuck position, the cam pin 27a of the link lever 27 rests in vertical groove portions of the cam groove 43 and the guide slit 28, and thus the forward slide of the loading slider 41 does not move the disk loading arm 25. Similarly, the cam pin 46a of the link lever 46 rests in the vertical groove portion 44b of the cam groove 44, and thus the disk support arm 24 does not move.

The cam pin 45a of the link lever 45, in contrast, rests in the horizontal groove portion 44e, and thus the forward slide of the loading slider 41 causes the follower slider 52 to slide in the leftward direction of FIG. 4 due to the cam pin 45b and the slit 52a. Guided by the bent portion 10b of the base panel 10 and the guide plate 53, the follower slider 52 slides on the bottom plate 2a.

As described above, when the disk D reaches the chuck position, the lifting pin 29 of the lifting frame 11 enters the sloping groove portion 65b of the lifting cam groove 65 in the follower slider 52. Also, the cam follower pin 77 of the holding member 17 enters the sloping groove portion 63b of the swinging cam groove 63 in the loading slider 41. Then, the follower slider 52 slides in tandem with the loading slider 41, without moving the disk support arm 24 and the disk loading arm 25. The lifting pin 29 moves along the sloping groove portion 65b, and the cam follower pin 77 moves along the sloping groove portion 63b and, as a result, the lifting frame 11 and the holding member 17 start moving from the lowered position up to the chuck position.

Figure 8:
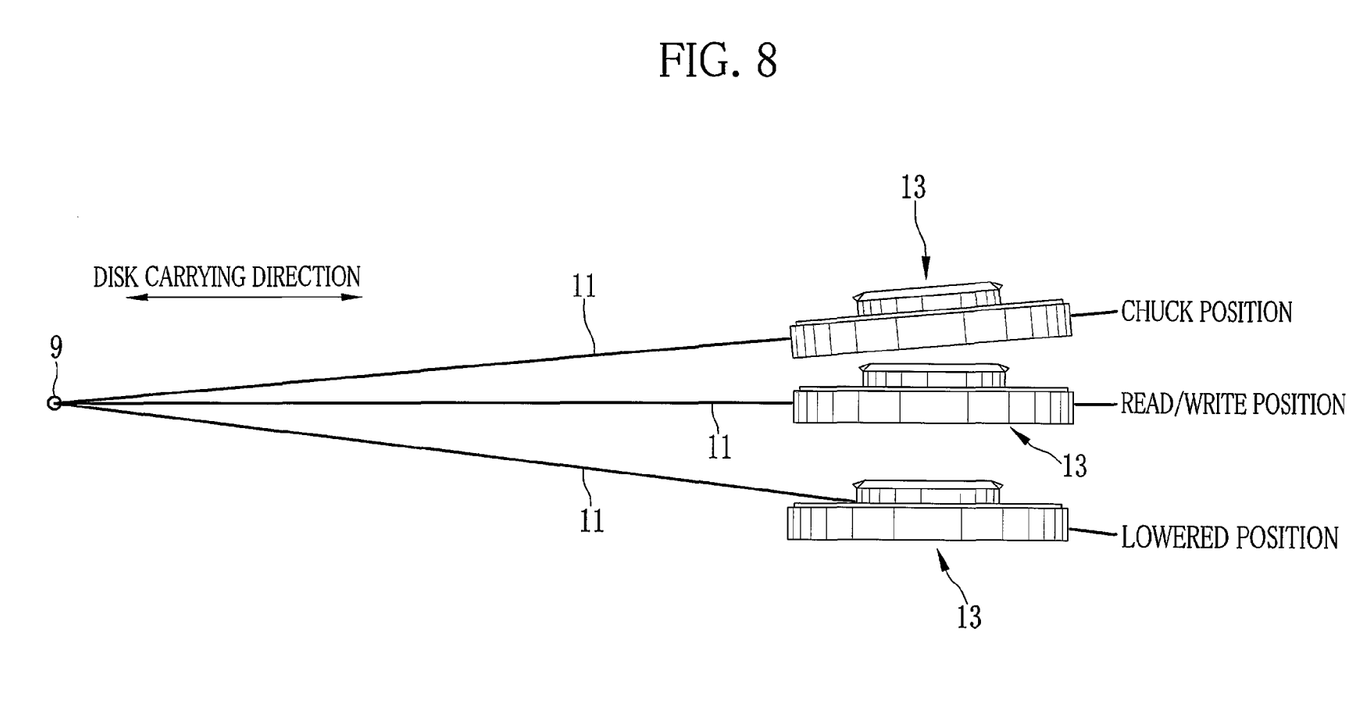
FIG. 8 is a side view showing movements of the lifting frame and a turntable unit.

When the lifting frame 11 and the holding member 17 reach the read/write position, the chucking head 16 comes into contact with the center hole Da of the disk D. At this point, as shown in FIG. 8, the turntable unit 13 is substantially parallel to the lifting frame 11.

Figure 7B:
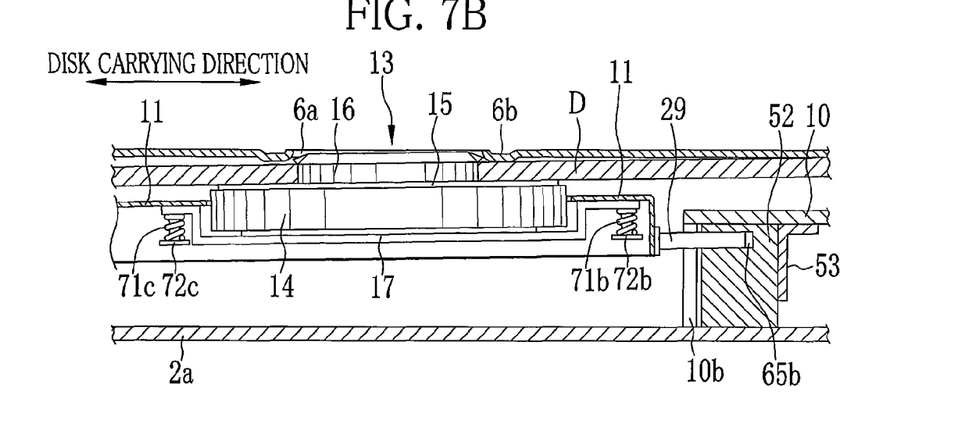

As the lifting frame 11 and the holding member 17 go up slightly, the disk D is received by the arcuate projection that is the reverse side of the arcuate groove 6b on the top plate 6. The lifting frame 11 and the holding member 17 still go up and, as shown in FIG. 7B, the chucking head 16 fits into the center hole Da of the disk D, and catches the center hole Da with chucking claws 16a. At this point, or namely, at the completion of the chucking operation, the lifting pin 29 reaches the highest point of the lifting cam groove 65, and the cam follower pin 77 reaches the highest point of the swinging cam groove 63, and the lifting frame 11 and the holding member 17 reside in the chuck position. In between the read/write position and the chuck position, the holding member 17 stays parallel to the lifting frame 11, and keeps tight contact with the lifting frame 11.

Figure 7C:
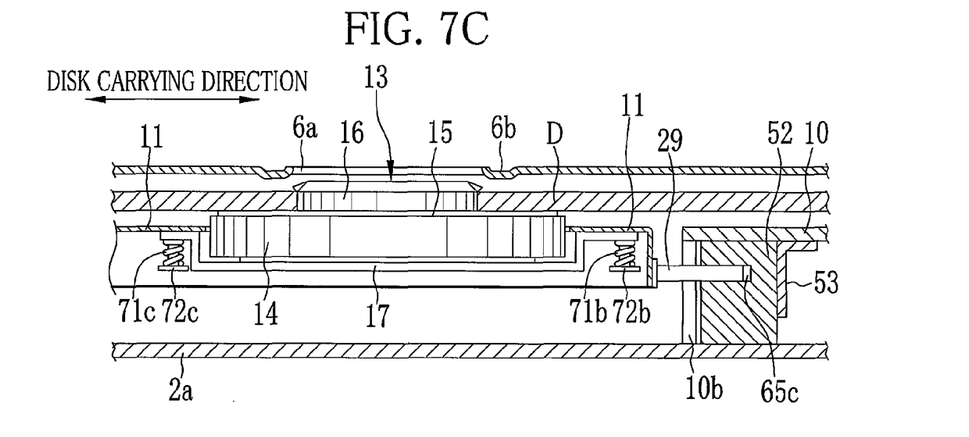

After the chucking operation and as the loading slider 41 and the follower slider 52 are sliding, the lifting pin 29 moves from the highest point of the lifting cam groove 65 to pass across the sloping groove portion, and enters the flat higher groove portion 63c. As a result, as shown in FIG. 7C, the lifting frame 11 and the holding member 17 are placed in the read/write position slightly down the chuck position. In the read/write position, the lifting frame 11 is parallel to the disk carrying direction. The holding member 17 is pushed by the coil springs 71a to 71c to make tight contact with the lifting frame 11, and thus the turntable unit 13 is placed parallel to the disk carrying direction.

While the lifting frame 11 and the holding member 17 are moving from the chuck position to the read/write position, the cam pin 27a in the cam groove 43 is pushed to move in the horizontal groove portion 28a of the guide slit 28. This movement of the cam pin 27a causes the disk loading arm 25 to rotate slightly in the counterclockwise direction of FIG. 3 about the pivot 26, and the flanged roller 25a comes away from the leading edge of the disk D.

Upon reaching of the lifting frame 11 and the holding member 17 to the read/write position, the loading motor 38 stops rotating. Then, the spindle motor 14 starts rotating to spin the disk D. The thread motor 34 starts rotating to move the carriage 19 along the guide shafts 32, 33. The pickup element 20 on the carriage 19 reads data from or writes data to the spinning disk D while moving in the radial direction of the disk D.

To stop the data read/write operation, the push button 4 is depressed. In response, the spindle motor 14 stops rotating, and the thread motor 34 rotates in the opposite direction to return the carriage 19 to its initial position. Then, the loading motor 38 starts rotating in the opposite direction to actuate the disk carrying mechanism 40, which starts the disk ejecting operation, or the reverse procedure to the disk loading operation.

In particular, the loading slider 41 slides to the bezel 3, and causes the follower slider 52 to slide in the rightward direction of FIG. 4. This backward slide of the loading slider 41 causes the disk support arm 24 and the disk loading arm 25 to rotate slightly and hold the edge of the disk D. The disk support arm 24 and the disk loading arm 25 firstly go up to the chuck position as in FIG. 7B, and then go down to the lowered position as in FIG. 7A by way of the read/write position as in FIG. 7C.

In this downward movement, the disk guide peace 21 is received by the chuck-release pin 22. While the loading slider 41 and the follower slider 52 are still going down, the disk guide piece 21 supports the bottom of the disk D to stop it from descending. As the chucking head 16 keeps going down with lifting frame 11, the disk D pushes the chucking claws 16a, and comes off from the chucking head 16.

Upon reaching of the lifting frame 11 and the holding member 17 to the lowered position, the follower slider 52 stops sliding, and only the loading slider 41 slides backward. This slide of the loading slider 41 leads to rotate the disk support arm 24 and the disk loading arm 25, and carry the disk D to the ejected position shown in FIG. 4. When the disk D is ejected, the switch 59 turns off to stop the loading motor 38 and the disk carrying mechanism 40.

As described above, when the lifting frame 11 stays in the lowered position, the holding member 17 inclines from the lifting frame 11 so as to place the turntable unit 13 parallel to the disk carrying direction. Therefore, compared to the conventional turntable unit affixed to the lifting frame 11, the moving distance of the lifting frame 11 in the disk loading/ejecting operations (i.e., the distance between the read/write position and the lowered position) can be decreased. As a result, the disk device 1 has an ever-thinner profile.

The follower slider may be omitted by configuring the loading slider 41 to raise and lower the lifting frame 11 and to swing the holding member 17.

The present invention is preferably applicable to multi-disk devices supporting both 8 cm and 12 cm disks.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A disk device having a turntable unit for rotating a disk and a pickup head for reading data from and writing data to said disk in rotation, said disk device comprising:

a disk carrying mechanism for holding said disk inserted through a slot on a case of said disk device and carrying said disk to above said turntable unit in a disk loading operation, and for holding said disk on said turntable unit and carrying said disk out of said slot in a disk ejecting operation;

a lifting frame for movably supporting said pickup head, and for swinging up and down about a rear end of said lifting frame disposed near said slot so as to raise and lower a front end of said lifting frame;

a turntable unit holding member for holding said turntable unit, and being swingably attached to said front end of said lifting frame;

a lifting frame shift mechanism configured to work with said disk carrying mechanism, and for shifting said lifting frame between a chuck position above a read/write position where data is read from or written to said disk and a lowered position below said read/write position so as to allow said disk to be carried in and out; and a turntable unit shift mechanism configured to work with said disk carrying mechanism, and for swinging said turntable unit from a parallel position to a retracted position as said lifting frame is shifted down from said read/write position to said lowered position, said turntable unit being substantially parallel to said lifting frame in said parallel position and being inclined from said lifting frame in said retracted position so as to lower one end of said turntable unit near said slot relative to another end of said turntable unit further from said slot.

2. The disk device of claim 1, wherein said disk carrying mechanism comprises:

a loading slider to slide when said disk is carried;

a follower slider to slide with said loading slider; and a plurality of arms for working with said loading slider or said follower slider, and for swinging said disk up and down while holding said disk from both sides.

3. The disk device of claim 2, wherein said loading slider slides in a carrying direction of said disk, and said follower slider slides in a crosswise direction to said loading slider.

4. The disk device of claim 3, wherein said lifting frame shift mechanism comprises:

a lifting pin attached to said lifting frame; and a cam groove formed in said loading slider or said follower slider, and for receiving said lifting pin.

5. The disk device of claim 3, wherein said turntable unit shift mechanism comprises:

a cam follower pin attached to said turntable unit holding member; and a cam groove formed in said loading slider, and for receiving said cam follower pin.

6. The disk device of claim 1, further comprising:

a plurality of support rods attached to said lifting frame, and for movably supporting said turntable unit holding member; and coil springs fitting onto said support rods, and for pushing said turntable unit to said lifting frame.

* * * * *